Aug. 21, 1956 J. M. THOMAS 2,759,766
HYDRANT SPRINKLER FOR PLAYGROUNDS
Filed Aug. 7, 1953 2 Sheets-Sheet 1
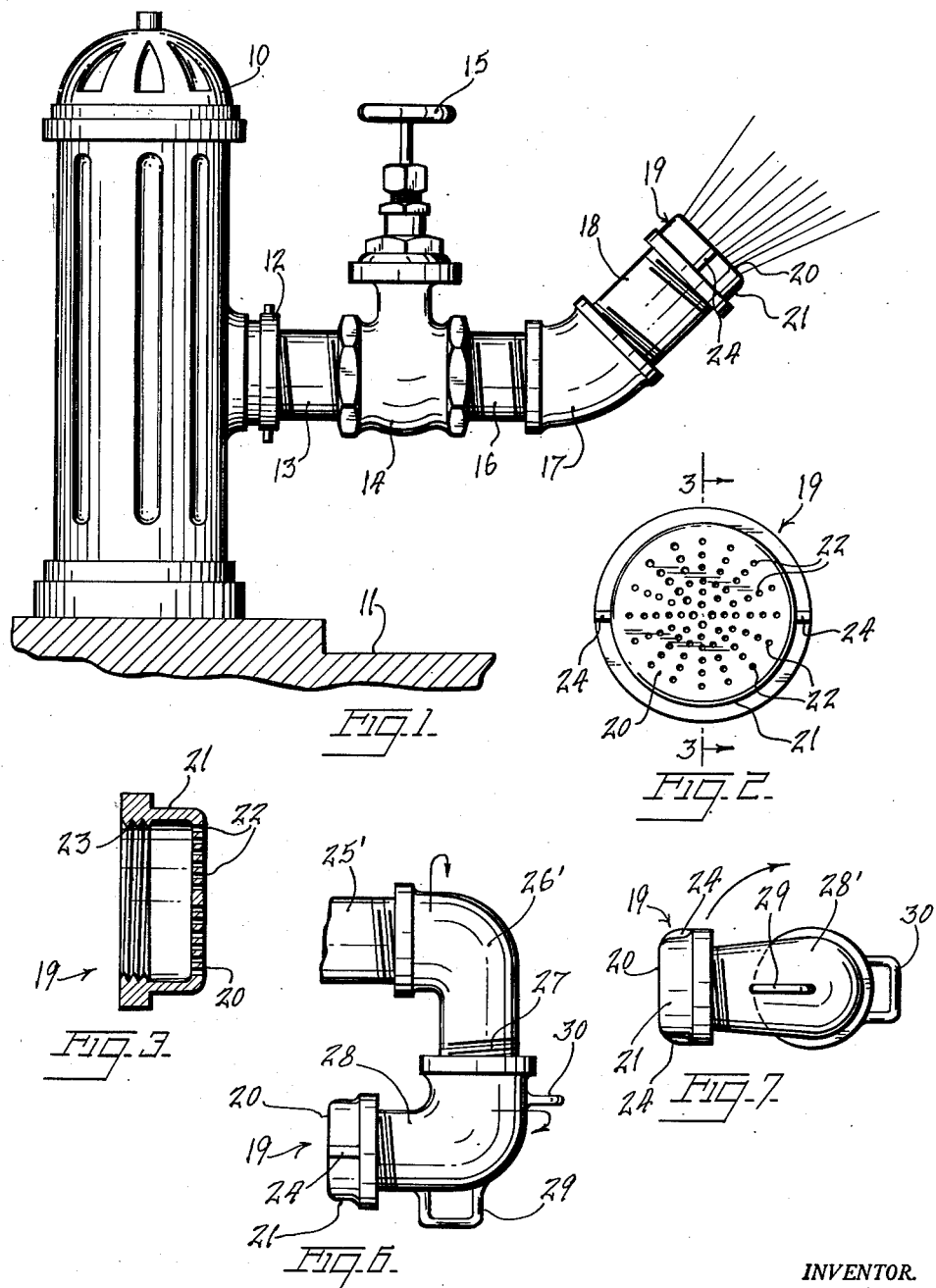
INVENTOR.
JOHN M. THOMAS
BY
ATTORNEY Aug. 21, 1956   J. M. THOMAS   2,759,766
HYDRANT SPRINKLER FOR PLAYGROUNDS
Filed Aug. 7, 1953   2 Sheets-Sheet 2

INVENTOR.
JOHN M. THOMAS
BY
*Zoltan Holocheh*
ATTORNEY

United States Patent Office 2,759,766
Patented Aug. 21, 1956

2,759,766
HYDRANT SPRINKLER FOR PLAYGROUNDS
John M. Thomas, Yonkers, N. Y.

Application August 7, 1953, Serial No. 372,864

1 Claim. (Cl. 299—73)

This invention relates to sprinkling apparatus and more particularly to new and useful improvements in an outdoor water hydrant sprinkler.

A principal object of the present invention is to provide a sprinkler which is especially suitable for connection to a water hydrant on the street for spraying children in the street or in a playground adjacent the street in the summer time.

A further object of the invention is to provide a rigid sprinkler for an outloor water hydrant with a unit adapted to direct the water outwardly onto the street and upwardly at an angle to the horizontal for spraying children at play on the street.

It is further proposed according to a modification of the invention to provide a sprinkler with a unit adapted to direct the water to the rear of the building line along the street and upwardly at an angle to the horizontal for sprinkling children in a school playground, or for conditioning a tennis court.

Another object of the invention is to provide an outdoor water hydrant sprinkler which is simple and durable in construction and which can be manufactured and sold at a reasonable cost.

For a further comprehension of the invention and of the objects and advantages thereof, reference will be had to the following description and accompanying drawings and to the appended claim in which the various novel features of the invention are more particularly set forth.

In the accompanying drawings forming a material part of this disclosure:

Fig. 1 is a side elevational view of a sprinkler embodying one form of the invention, in position on an outdoor water hydrant.

Fig. 2 is a front view of the spray head.

Fig. 3 is a sectional view taken on the plane of the line 3—3 of Fig. 2.

Fig. 6 is a fragmentary side elevational view showing a modified form of pipe element or adapter for supporting the spray head.

Fig. 7 is a bottom view of the spray head-supporting adapter shown in Fig. 6.

Figure 4:
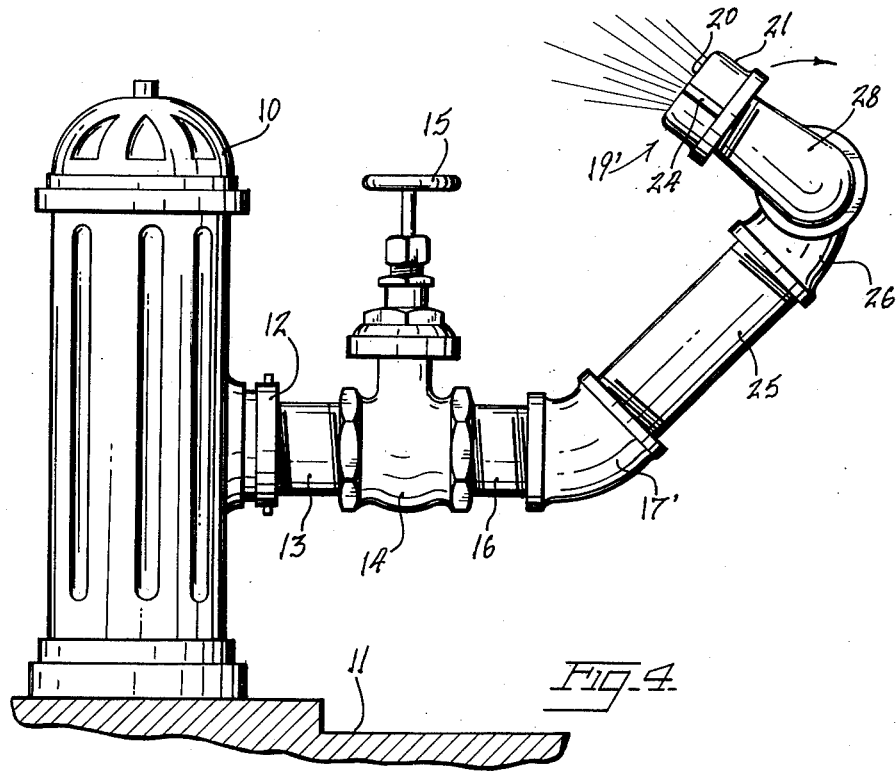
Fig. 4 is a side elevational view of a sprinkler embodying a modified form of the invention, in position on an outdoor water hydrant.

Referring to Figs. 1, 2 and 3 showing the first form of the invention, the sprinkling apparatus is shown connected to a water hydrant 10 mounted as usual along the side of a street indicated at 11. The sprinkler comprises an ordinary coupling 12 which is screwed on to the hydrant for detachably connecting the sprinkler to the hydrant. A length of threaded pipe 13 is screwed into the coupling 12 and is connected to one end of an ordinary gate valve 14 having an operating handle 15. Another length of threaded pipe 16 connects the outlet end of the valve 14 to a 45° elbow 17, the outlet end of which is directed upwardly. A length of pipe 18 connects the outlet end of the elbow to a spray head or cap 19. The spray head is cup-shaped with a plane front wall 20 and a side wall 21. The front wall is formed with a plurality of perforations 22 arranged in circular rows. The side wall 21 is formed with internal screw threads 23 for mounting the spray head onto the pipe 18. Opposed ribs 24 are formed on the outer surface of the side wall to facilitate turning of the spray head. As no sprinkler perforations are provided in the side wall of the spray head, the entire force of water passes outwardly through the perforation in the front wall 20 thereby forcing the water to a greater distance and to best advantage than it would if additional perforations were provided in the side wall.

In practical use, the sprinkling apparatus is mounted on the water hydrant 10 on the street and the water is introduced through the pipe 13 and controlled by the valve 14. The water is discharged through the perforations 22 in the spray head 19. Because of the inclined arrangement of the pipe 18 and spray head 19, the jets of water discharged move upwardly and forwardly onto an area on the street. The arrangement of the perforations in annular rows causes the column of water discharged therefrom and composed of a plurality of jets to appear to twist throughout its length until such tendency is overcome by gravity. The jets discharged through the perforations extend unbroken for a considerable distance on straight lines influenced by gravity and then break up into drops simulating to a remarkable degree falling rain.

Figure 5:
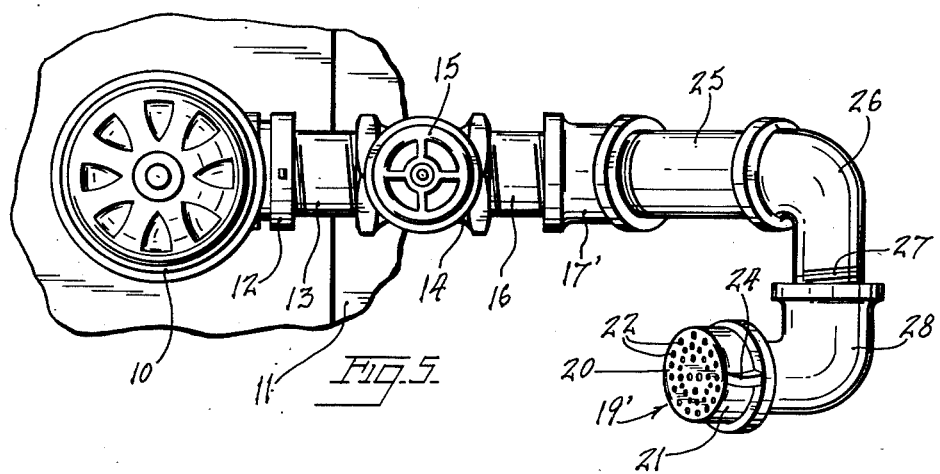
Fig. 5 is a top plan view of the sprinkler of Fig. 4.

In the modification of the invention shown in Figs. 4 and 5, a longer length of pipe 25 is shown in place of the length of pipe 18 of the form of invention of Fig. 1. Pipe 25 is screwed at one end into the 45° elbow 17' and at its other end into a 90° elbow 26, the externally threaded end 27 of which extends at right angles to the pipe 25. The elbow 26 is screwed into a 90° elbow or adapter unit 28 which is tilted at an angle to the pipe 25, and supports the spray head 19' at its free end. The adapter 28 is tilted at an angle to the pipe 25 in order to point the spray head upwardly at an angle to the horizontal and in a direction to the rear and side of the hydrant 10. This inclined arrangement of adapter and spray head causes the water to be directed upwardly and rearwardly to any desired area, such as a school playground and tennis court, behind the building line of the street.

In all other respects the form of invention of Fig. 4 is similar to the form of Fig. 1 and similar reference numerals are used to indicate similar parts.

The elements composing the sprinkler apparatus especially the elbows and adapter are quite heavy, cumbersome and awkward to manipulate so that the tilting and adjustment of the adapter and spray head to proper angular relationship with respect to the area to be sprinkled is rather difficult. In order to overcome this difficulty, the modified form of adapter 28' shown in Figs. 6 and 7 is formed with an integral handle 29 to facilitate turning of the adapter in one direction, to wit, around the axis of the elbow 26', in the direction of the arrow on the adapter 28', and with another handle 30 extending in a direction at right angles to the direction of the handle 29 for turning the adapter 28' and the elbow 26 as a unit around the axis of the pipe 25'.

In all other respects the form of invention of Fig. 6 is similar to that shown in Fig. 7 and similar reference numerals are used to indicate similar parts.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention what I claim as new and desire to secure by United States Letters Patent is:

A sprinkler for use with an outdoor water hydrant consisting of a plurality of connected longitudinally extending tubular members including a threaded coupling, a threaded pipe secured at one end to said coupling, a gate valve secured at one side to the other end of said pipe, a handle on said valve for manipulating same; another threaded pipe secured to the other side of the valve, a 45° elbow connected at its inlet end to said latter pipe and with its outlet end inclined upwardly, a threaded pipe connected to the outlet end of said elbow, a 90° elbow connected to said latter pipe and extending at right angles thereto, a 90° elbow-shaped adapter connected to said 90° elbow and extending in a direction reverse to said last-named pipe and at an angle thereto, a perforated spray head on the end of said adapter, and spaced inverted U-shaped handles formed integrally with the adapter, one of said handles being positioned adjacent one end of the adapter and being disposed parallel to the axis of said end of the adapter whereby the adapter may be bodily rotated around the axis of said end, the other of said handles being positioned adjacent the other end of the adapter and being disposed transversely to the axis of said other end whereby the adapter may be bodily rotated around the axis of said other end of the adapter.

References Cited in the file of this patent

UNITED STATES PATENTS

| | | |
|---|---|---|
| 444,329 | Brooks | Jan. 6, 1891 |
| 916,886 | Merryman | Mar. 30, 1909 |
| 993,498 | Bolitho | May 30, 1911 |
| 1,083,307 | Thorne | Jan. 6, 1914 |
| 1,100,165 | Waller | June 16, 1914 |
| 2,076,445 | Callander | Apr. 6, 1937 |
| 2,085,854 | Hathaway | July 6, 1937 |
| 2,144,619 | Corley | Jan. 24, 1939 |
| 2,319,068 | Krone | May 11, 1943 |
| 2,501,638 | Warren | Mar. 21, 1950 |
| 2,640,726 | Prescott | June 2, 1953 |

FOREIGN PATENTS

| | | |
|---|---|---|
| 23,476 | Great Britain | 1913 |

OTHER REFERENCES

Sears, Roebuck Catalog #202 (1951), p. 912.